April 8, 1969     N. P. FORSBERG     3,437,994
SIGNALING APPARATUS FOR MOTOR VEHICLES
Filed June 23, 1966
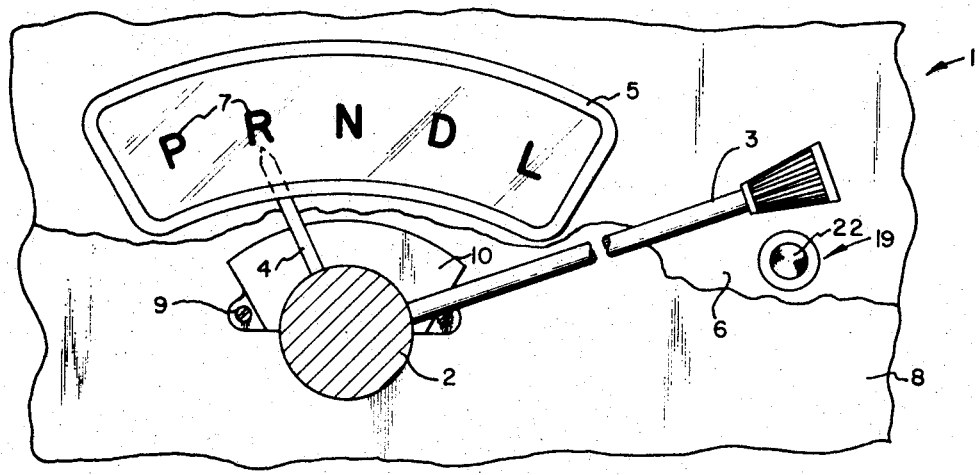
FIG. 1
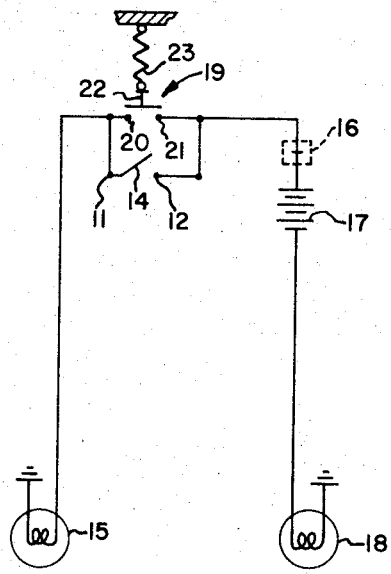
FIG. 2
FIG. 3
INVENTOR.
NORMAN P. FORSBERG
BY
*Learman, Learman & McCulloch*
ATTORNEYS

United States Patent Office 3,437,994
Patented Apr. 8, 1969

3,437,994
SIGNALING APPARATUS FOR MOTOR VEHICLES
Norman P. Forsberg, 11429 S. Dixie Highway,
Holly, Mich. 48442
Filed June 23, 1966, Ser. No. 559,812
Int. Cl. B60q 1/30
U.S. Cl. 340—70                    5 Claims This invention relates to automotive vehicle signaling apparatus and more particularly to signal apparatus adapted to utilize lamps with which a vehicle conventionally is equipped and in such manner as not to interfere with the normal function of such lamps.

It is conventional practice to equip an automotive vehicle with so-called back-up lamps comprising one or more lamps mounted at the rear of the vehicle and arranged to illuminate the area rearwardly of the vehicle so as to minimize the dangers inherent in backing the vehicle at night. It also is conventional practice to provide such a vehicle with switching means inaccessible to the driver but which are operable automatically to illuminate the back-up lamps whenever the transmission gear selector lever is shifted into a position to enable the vehicle to be backed. Due to the inaccessibility of the switch means, the back-up lamps cannot be illuminated unless the gear selector lever is in its reversing position.

There are many instances in which it would be desirable for the driver of one vehicle to be able to transmit a signal to the driver of a following vehicle. For example, some thoughtless drivers frequently follow other vehicles at night with their head lamp high beams illuminated. The high beam headlamps of a following vehicle quite often are reflected by the rear view mirrors of the leading car directly into the eyes of its driver, thereby adversely affecting his vision and creating a potentially dangerous condition. If the leading car were equipped with some kind of signaling device directed rearwardly toward the following vehicle, its driver could be signaled to switch his head lamps to low beam illumination.

Another instance in which a rearwardly directed signaling device is desirable is that in which one vehicle follows too closely behind another vehicle. This practice involves considerable danger not only to the following vehicle but to the followed vehicle as well inasmuch as all too often the following vehicle is incapable of being brought to a stop quickly enough to avoid colliding with the leading vehicle when the latter is forced to come to an abrupt stop. A rearwardly directed signal operable by the driver of the leading car could in many cases warn the driver of the following car that he is following too closely and thereby enable the following driver to increase the spacing between the two cars prior to the presence of an emergency.

The back-up lamps of vehicles make ideal rear signaling devices because they are directed rearwardly of the vehicle on which they are installed and thus are aimed at a following vehicle. Moreover, the conventional back-up lamps have clear or white lenses and therefore are not likely to be confused with the stop lamps or direction signaling lamps with which vehicles conventionally are equipped. Furthermore, the clear or white lens enable the back-up lamps to be seen clearly for quite a long distance.

Although the back-up lamps with which vehicles conventionally are equipped would be ideal rear signaling devices, it is not possible to utilize them for signaling purposes inasmuch as they cannot be energized unless the gear selector lever is shifted to its reversing position. It obviously is impractical for the driver of the vehicle moving forwardly at highway speed to shift into reverse. As a result, apparatus which could function admirably as a safety warning or signaling device is incapable of such use.

An object of this invention is to provide apparatus for use in conjunction with back-up lamps and related equipment conventionally provided on motor vehicles for enabling such equipment to perform safety warning functions in addition to those for which it originally was intended.

Another object of the invention is to provide safety warning apparatus of the character described and in which the capability of the vehicle's equipment to function as originally intended is unimpaired.

A further object of the invention is to provide apparatus of the kind referred to and which is equally adapted for installation as original equipment or as an accessory for subsequent installation.

Another object of the invention is to provide safety warning apparatus as described and in which the construction and arrangement of the apparatus are such that it is impossible for it to be utilized in an improper manner.

Other objects and advantages of the invention will be pointed out specifically or will become apparent from the following description when it is considered in conjunction with the appended claims and the accompanying drawing, in which:

FIGURE 1 is a fragmentary elevational view of a portion of a vehicle and illustrating a gear selector lever and its relation to apparatus constructed in accordance with the invention;

FIGURE 2 is a sectional view of a portion of the apparatus shown in FIGURE 1 and illustrating a typical switching arrangement for energizing a vehicle's back-up lamps in response to shifting of the gear selector lever to its reverse position; and FIGURE 3 is a schematic wiring diagram illustrating apparatus constructed and arranged in accordance with the invention.

Apparatus constructed in accordance with the invention is adapted for use in conjunction with an automotive vehicle 1 having a rotatable shaft 2 to which is fixed an operating lever 3 which may be manipulated by a vehicle driver to condition the vehicle's transmission according to a selected one of a number of conditions. Thus, the lever 3 may be manipulated to rock the shaft 2 and shift mechanism (not shown) connected to the shaft in such manner as to position the vehicle's transmission in park, reverse, neutral, drive or low. The shaft 2 conventionally is provided with a pointer 4 which rocks with the shaft and projects into a housing 5 mounted on or adjacent the vehicle's dashboard 6 and provided with indicia 7 to indicate the condition of the transmission setting. Thus, the indica may use letters P, R, N, D and L to correspond respectively to the park, reverse, neutral, drive and low transmission settings.

Mounted on the vehicle's firewall 8 or on any other suitable support by means of screws 9 or the like is a casing 10 within which is a pair of electrically conductive contacts 11 and 12. Attached to the shaft 2 for rocking movement therewith and projecting into the casing 10 is a carrier arm 13 on which is mounted a bridging switch member 14 which is adapted to span and interconnect the contacts 11 and 12 only when the shaft is rocked to a position corresponding to the reverse position of the transmission. In all other positions of the shaft 2, the switch member 14 is disengaged from at least one of the contacts 11 and 12.

The casing 10 and the switch parts 11, 12 and 14 conventionally are inaccessible to the driver of the vehicle and, accordingly, the contacts 11 and 12 can be electrically interconnected only in response to movement of the gear selector lever 3 to the reversing position of the vehicle's transmission.

The contact 11 conventionally is connected by suitable wiring to a left-hand back-up lamp 15 mounted at the rear of the vehicle, and the contact 12 conventionally is connected through an ignition switch controlled terminal 16 through the vehicle's battery 17 to a second or right-hand back-up lamp 18. The arrangement is such that, when the switch 14 bridges the contacts 11 and 12, and with the ignition terminal 16 closed, the back-up lamps 15 and 18 will be energized so as to illuminate the area to the rear of the vehicle.

Apparatus constructed according to the invention preferably comprises a push button switch 19 shunting the switch 14 and mounted on the vehicle's dashboard 6 or in any other location convenient to the vehicle driver. The switch 19 includes two spaced apart contacts 20 and 21 connected in circuit with the back-up lamps 15 and 18 and a movable bridging contact 22 that is capable of bridging and interconnecting the contacts 20 and 21 so as to effect energization of the lamps 15 and 18 irrespective of the position of the gear selector lever 3. Preferably, the movable contact 22 is biased by a spring 23 to an inactive or disengaging position, thereby requiring the vehicle driver to maintain a constant force on the contact 22 to maintain the lamps 15 and 18 illuminated. Each of the switch members 14 and 22 is operable independently of the other.

In the operation of the apparatus, the driver of the vehicle 1 wishing to signal the driver of a following vehicle may depress the contact 22 so as to illuminate the back-up lamps 15 and 18. The lamps may be permitted to glow steadily by holding the switch closed or, if desired, the lamps may be blinked intermittently to cast a clear white beam to the eyes of the oncoming driver. Upon release of the contact 22, the switch 19 will be opened, thereby avoiding inadvertent energization of the back-up lamps. Whenever the gear selector lever 3 is rocked to its reversing position, the back-up lamps will be energized, assuming the ignition controlled contact 16 is closed. Thus, the auxiliary switch 19 has no effect on the normal operation of the conventional back-up lamp circuitry.

I claim:
1. In an automotive vehicle having at least one back-up lamp mounted at the rear thereof and adapted for electrical connection in circuit with a source of electrical energy, gear selector means movable to and from a plurality of selected positions one of which is a vehicle reversing position, and switch means movable with said selector means into and out of one position in which said lamp is connected in circuit with said source, said one position of said switch means corresponding to the reversing position of said selector means: the improvement comprising a manually operable switch shunting said switch means and operable independently of said switch means to connect said lamp in circuit with said source regardless of the position of said selector means.

2. The construction set forth in claim 1 wherein said switch is normally open.

3. The construction set forth in claim 1 including spring means acting on said switch and constantly biasing the latter to its normally open position.

4. The construction set forth in claim 1 including means mounting said switch on said vehicle in a position remote from said switch means.

5. The construction set forth in claim 4 wherein said switch means is inaccessible to the driver of said vehicle and is movable into and out of its said one position solely in response to movement of said selector means.

References Cited

UNITED STATES PATENTS 1,469,337  10/1923  Sanborn _____ 340—52

ALVIN H. WARING, *Primary Examiner.*

U.S. Cl. X.R.

340—52, 91; 200—61.88; 116—36